US007612765B2

(12) United States Patent
Wernersson

(10) Patent No.: US 7,612,765 B2
(45) Date of Patent: Nov. 3, 2009

(54) ACTUATED MULTI-FACED KEYS

(75) Inventor: Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 645 days.

(21) Appl. No.: 11/335,843

(22) Filed: Jan. 20, 2006

(65) Prior Publication Data

US 2007/0171207 A1    Jul. 26, 2007

(51) Int. Cl.
*G06F 3/02* (2006.01)
(52) U.S. Cl. .................. 345/168; 345/156; 345/172; 341/22; 341/20; 341/23; 455/550.1; 455/575.1
(58) Field of Classification Search ......... 345/156–169; 341/20–35; 455/550.1, 575.1
See application file for complete search history.

(56) References Cited

U.S. PATENT DOCUMENTS

| 4,348,660 | A |   | 9/1982  | Robertsen et al. |
| 4,965,545 | A | * | 10/1990 | Johnson ............... 337/140 |
| 6,226,906 | B1 | * | 5/2001  | Bar-Yona ............. 40/454 |
| 2005/0070324 | A1 | * | 3/2005  | Chadha .............. 455/550.1 |

FOREIGN PATENT DOCUMENTS

| DE | 37 12 571 A1 | 11/1988 |
| JP | 4-184823 |   | 7/1992 |
| JP | 4184823 | * | 7/1992 |

OTHER PUBLICATIONS

WO2005/008412 A2,Shared Input key method and apparatus,Jan. 27, 2005, WIPO.*
T.W.Duerig, K.N.Melton, Designing with the shape Memory Effect,MRS 1989,vol. 9, 581-597.*
International Search Report for corresponding PCT application with a mailing date of Nov. 27, 2006; 5 pages.
T. W. Duerig; "Applications of Shape Memory"; Materials Science Forum; vols. 56-58 (1990); pp. 679-691.
"New Systems—Lenticular Effects"; www.newsystems.com; (print date) May 4, 2006; 1 page.

* cited by examiner

*Primary Examiner*—Richard Hjerpe
*Assistant Examiner*—Ishara T Perumpulliarachchige
(74) *Attorney, Agent, or Firm*—Harrity & Harrity, LLP

(57) ABSTRACT

An assembly may include information that includes a first plurality of stripes making up a first icon and a second plurality of stripes making up a second icon. The assembly may include an actuator configured to displace the information to a first position in response to a change in length of a first wire to displace the information to a second position in response to a change in length of a second wire. The assembly may include a lenticular lens configured to display the first icon to a user when the actuator is in the first position, and to display the second icon to the user when the actuator is in the second position.

23 Claims, 10 Drawing Sheets

FIRST DISPLACEMENT DIRECTION
424

SECOND DISPLACEMENT DIRECTION
426

ACTUATED MULTI-FACED KEYS

BACKGROUND OF THE INVENTION

1. Technical Field of the Invention

Implementations described herein relate generally to input devices and, more particularly, to input devices in which displayed information can be changed.

2. Description of Related Art

Devices, such as mobile communication devices, may use a keypad as a user interface. The keypad may include keys that are depressed by a user to implement functions on the mobile device. For example, a user may depress numerical keys to dial a telephone number of a destination. Alternatively, a user may wish to interact with alphanumeric keys when performing other operations, such as sending a text message.

Keypad real estate is typically limited on a device. As a result, a keypad key might have several pieces of information associated with it. For example, a device may have a key that causes the number nine to be input or displayed when the key is depressed. The device might cause the letter "w" to be input or displayed when the key is depressed a subsequent time. Users of the device may not readily understand how to cause the other pieces of information, such as the letter "w," to be input or displayed.

BRIEF SUMMARY OF THE INVENTION

According to one aspect, a method for providing key information to a user via a multi-faced keypad is provided. The method may include providing first key information to a user when an actuator is in a first position and receiving a request for second key information. The method may include displacing the actuator to a second position in response to the received request and providing the second key information to the user when the actuator is in the second position.

Implementations of the method may include applying a current to a wire to cause the actuator to displace to the second position, applying the current for a determined time that is based on a composition of the wire, or applying the current via a waveform. The method may also include displacing an icon sheet in a direction substantially parallel or substantially perpendicular to a direction of displacement of the actuator, displacing the icon sheet with respect to a lenticular lens, or displacing an icon sheet from a first position with respect to the actuator to a second position with respect to the actuator, where the displacing the icon sheet to the second position with respect to the actuator causes the second key information to be provided to the user. The method may include displacing the icon sheet a determined distance away from the actuator when the icon sheet is in the second position. An implementation of the method may include applying a current to contract a second wire and displacing the actuator from the second position to the first position in response to contracting the second wire, where the first position provides the first key information to the user.

According to another aspect, an assembly is provided. The assembly may include an icon sheet that includes a first image and a second image. The assembly may include an actuator configured to support a proximal end of a first wire having a first length, where the first wire configured to displace the actuator to a first position when the first length changes. The actuator may be configured to support a proximal end of a second wire having a second length, where the second wire is configured to displace the actuator to a second position when the second length changes. The assembly may include a lens configured to provide the first image to a user when the actuator is in the first position and to provide the second image to the user when the actuator is in the second position.

Implementations of the assembly may include a supply to provide a current to a distal end of the second wire to cause the second length to change. Implementations of the assembly may include an actuator that is configured to displace the icon sheet a first distance with respect to a portion of the lens when the actuator is in the first position, displace the icon sheet a second distance with respect to the portion of the lens when the actuator is in the second position, and maintain the second distance over a range of actuator displacements. Implementations of the assembly may include a first image that has a first relationship with respect to the lens when the first distance is present and a second relationship with respect to the lens when the second distance is present. Implementations of the assembly may include coupling the actuator to ground. Implementations of the assembly may include a back lit first image or second image. Implementations of the assembly may include a first wire or second wire made from a memory shape alloy and the memory shape alloy may include nickel or titanium. Implementations of the assembly may use pulse width modulated (PWM) waveforms to cause a change in the first length or the second length. Implementations of the assembly may include a lenticular lens. Implementations of the assembly may include the lens in a first relationship with respect to the first image when the actuator is in the first position and in a second relationship with respect to the first image when the actuator is in the second position. Implementations of the assembly may include an icon sheet that is coupled to the actuator.

According to yet another aspect, an assembly is provided. The assembly may include a surface that includes a first plurality of stripes making up a first icon and a second plurality of stripes making up a second icon. The assembly may include an actuator configured to displace the surface to a first position in response to a change in length of a first wire and to displace the surface to a second position in response to a change in length of a second wire. The assembly may include a lenticular lens configured to display the first icon to a user when the actuator is in the first position, and to display the second icon to the user when the actuator is in the second position.

According to still another aspect, an assembly is provided. The assembly may include a window configured to display key information to a user when the key information is in the window and the assembly may include a surface that includes first key information, second key information, and third key information. The assembly may include an actuator configured to move in a first direction substantially parallel to the window to place the first key information into the window, to move in a second direction substantially opposite to the first direction to place the second key information into the window, and to move in a third direction substantially parallel to the window and substantially perpendicular to the first and second directions to place the third key information into the window.

According to yet another aspect, a device is provided. The device may include means to render a first image or a second image to a user when an actuator is in a first position and means to apply a current to a wire to cause the wire to change length. The device may include means to displace the actuator in response to the applied current and means to change a relationship between the first image or the second image and the rendering means in response to displacing the actuator, where the changed relationship causes the first image or the second image to be rendered to the user via the rendering means.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF THE INVENTION

The following detailed description of the invention refers to the accompanying drawings. The same reference numbers in different drawings may identify the same or similar elements. Also, the following detailed description does not limit the invention.

Implementations of the invention are used to provide multi-faced keys that can be used in a keypad, keyboard, or another arrangement of keys. Multi-faced keys consistent with the principles of the invention can be used in compact devices, such as portable devices, and larger devices, such as devices that are not configured to be easily transported by an individual. For example, multi-faced keys as described herein may be used in handheld devices (e.g., mobile communication terminals, PDA's, handheld computing devices, handheld calculators, handheld gaming devices, etc.) and desktop devices (e.g., full sized keyboards for desktop computing devices, etc.). Multi-faced keys consistent with the principles of the invention may further be used in handheld, desktop and other application specific devices (e.g., handheld test devices, rack mounted medical devices, vehicle mounted devices, aircraft mounted devices, military devices, etc.).

Exemplary implementations of the invention will be described in the context of a mobile communications terminal. It should be understood that a mobile communication terminal is an example of a device that can employ multi-faced keys consistent with the principles of the invention and should not be construed as limiting the types or sizes of devices or applications that can use implementations of multi-faced keys described herein.

Exemplary Mobile Terminal

Figure 1A:
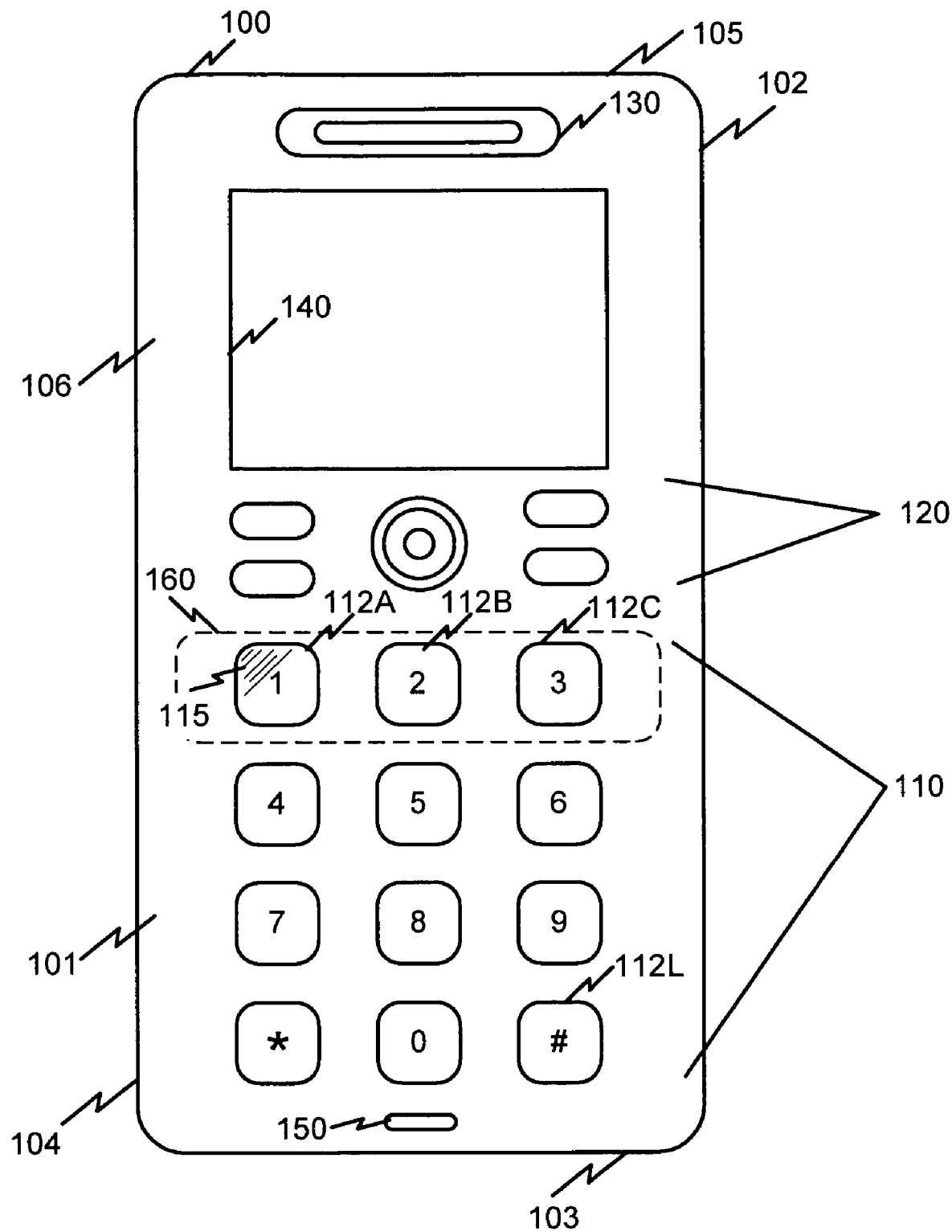
FIG. 1A is a diagram of an exemplary implementation of a mobile terminal that includes a keypad that can be configured using multi-faced keys consistent with the principles of the invention.

FIG. 1A is a diagram of an exemplary implementation of a mobile terminal that includes a keypad that can be configured using multi-faced keys consistent with the principles of the invention. Mobile terminal 100 (hereinafter terminal 100) may be a mobile communication device. As used herein, a "mobile communication device" and/or "mobile terminal" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, and/or global positioning system (GPS) receiver; and a laptop and/or palmtop receiver or other appliance that includes a radiotelephone transceiver.

Terminal 100 may include housing 101, keypad 110, control keys 120, speaker 130, display 140, and microphone 150. Housing 101 may include a structure configured to hold devices and components used in terminal 100. For example, housing 101 may be formed from plastic and configured to support keys 112, control keys 120, speaker 130, display 140 and microphone 150. Housing 101 may have an upper surface 101, first side 102, a second side 103, a third side 104, a fourth side 105, upper surface 106, and a lower surface (not shown). In one implementation, first side 102 may correspond to a right side of terminal 100, second side 103 may correspond to a lower side of terminal 100, third side 104 may correspond to a left side of terminal 100 and fourth side 105 may correspond to an upper side of terminal 100. Upper surface 106 may support lens 115 in a manner that makes information on keys 112 visible to a user of terminal 100.

Keypad 110 may include devices, such as keys 112A-L, that can be used to enter information into terminal 100. Keys 112A-L (collectively keys 112) may be arranged in groups, such as group 160 (keys 112A-C), to facilitate user interactions with terminal 100.

Keys 112 may be used in a keypad (as shown in FIG. 1A), in a keyboard, or in some other arrangement of keys. Implementations of keys 112 may have key information associated therewith. A user may interact with keys 112 to input key information into terminal 100. For example, a user may operate keys 112 to enter digits, commands, and/or text, into terminal 100.

In one implementation, keypad 110 may include lens assembly 115 (hereinafter lens 115) that may be used with one or more keys 112. Lens 115 may include a transparent or semi-transparent device that can magnify information associated with keys 112, that can cause first or second key information to be visible to a user, or that can protect key information from dirt or debris. In one implementation, key information may have a first displacement with respect to lens 115 when the user can see the first key information (e.g., a "2") and a second displacement with respect to lens 115 when the user can see the second key information (e.g., the letter "a").

Control keys 120 may include buttons that permit a user to interact with terminal 100 to cause terminal 100 to perform an action, such as to display a text message via display 140. Speaker 130 may include a device that provides audible information to a user of terminal 100. Display 140 may include a device that provides visual information to a user. For example, display 140 may provide information regarding incoming or outgoing calls, text messages, games, phone books, the current date/time, etc., to a user of terminal 100. Microphone 150 may include a device that converts speech into electrical signals for use by terminal 100.

Exemplary Multi-Faced Key Arrangement

Figure 1B:
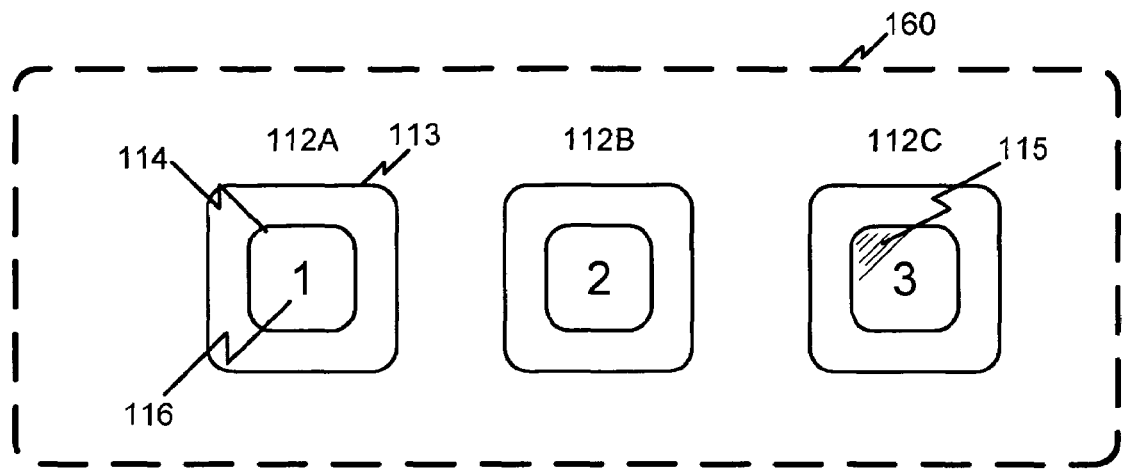
FIG. 1B illustrates an exemplary group of keys that are part of the keypad of the mobile terminal of FIG. 1A and that can be configured as multi-faced keys consistent with the principles of the invention.
Figure 1B:
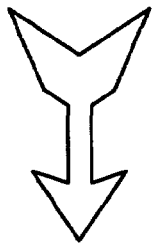
Figure 1B:
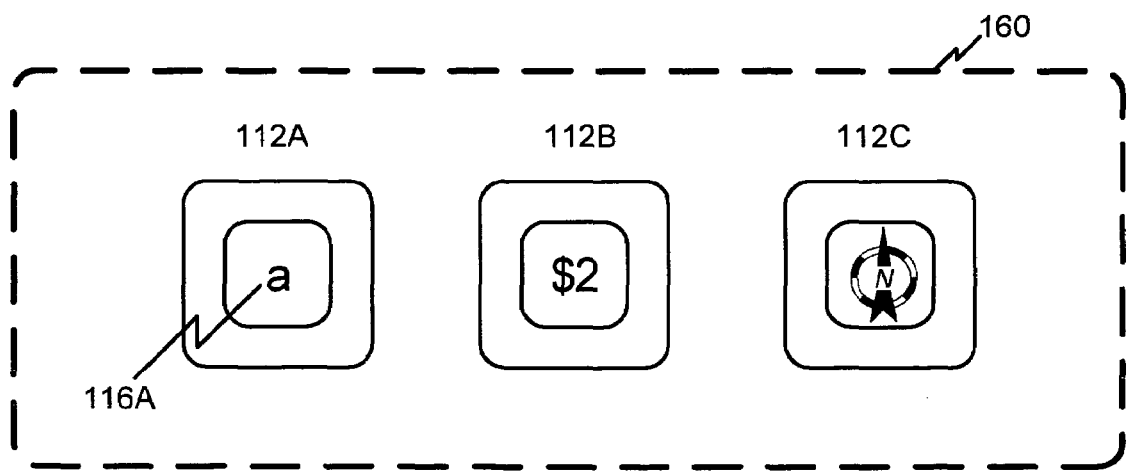

FIG. 1B illustrates an exemplary group of keys that are part of the keypad of the mobile terminal of FIG. 1A and that can be configured as multi-faced keys consistent with the principles of the invention. Group 160 may include keys 112A, 112B, and 112C. While the implementation of FIG. 1B illustrates a limited number of keys for brevity, groups and/or arrangements of keys may include substantially any number of keys consistent with the principles of the invention.

Keys 112, such as keys 112A-C, may include key housing 113, window 114 and key icons 116 and 116A. Key housing 113 may include a structure that defines a footprint for keys 112. Key housing 113 can be made from plastic, ceramic, rubber, metal, etc. and may be configured to cause an electrical connection to be formed when key housing 113 is depressed by a user.

Window 114 may include an opening in key housing 113 that is configured to display a key icon, such as key icon 116 or 116A, to a user. For example, key icons 116/116A may reside on a surface located below key housing 113. Window 114 may display key icons 116/116A to a user of terminal 100. Lens 115 may cover window 114 in a first implementation, may be located below window 114 and proximate to key icons 116/116A in a second implementation, and may not be used with window 114 or terminal 100 in a third implementation consistent with the principles of the invention.

Key icons 116/116A may include information (e.g., letters, numbers, symbols, images, etc.) that can be viewed by a user of terminal 100. Key icons 116/116A may be printed and may include back lighting to illuminate key icons 116/116A in low ambient lighting conditions, such as in a dimly lit room. In one implementation, key icons 116/116A may include two or more images that are interlaced (i.e., where two or more images are divided into stripes and the stripes for the two or more images are interlaced). For example, a key icon, such as key icon 116, may include a group of first stripes and another key icon, such as key icon 116A, may include a group of second stripes that are interlaced with the first group of first stripes. In another implementation, key icons 116/116A may not be interlaced. For example, key icon 116 may be associated with a first icon that is spaced a distance away from key icon 116A that is associated with a second icon. Key icon 116 may be moved into window 114 so that key icon 116 is visible to a user and then key icon 116A may replace key 116 in window 114 so that key icon 116A is visible to the user.

Group 160 may include keys 112A-C that are configured to display key icon 116 (i.e., 1, 2, and 3) (upper portion of FIG. 1B) or key icon 116A (i.e., a, $2, and the navigation symbol for north) (lower portion of FIG. 1B). Implementations consistent with the principles of the invention may use an actuator to move a surface that includes key icon 116/116A relative to window 114 and lens 115. Movement of key icons 116/116A with respect to window 114 and lens 115 may cause key icon 116 or key icon 116A to be visible to a user of terminal 100.

Exemplary implementations described herein may allow a number of information/icon types to be displayed to a user using a single key 112. For example, a first implementation may interlace two or more icons that can be viewed through window 114 using a lenticular lens, and a second implementation may use non-interlaced icons that can be viewed through window 114 using a clear non-magnifying lens or without using a lens.

Exemplary Functional Diagram

Figure 2:
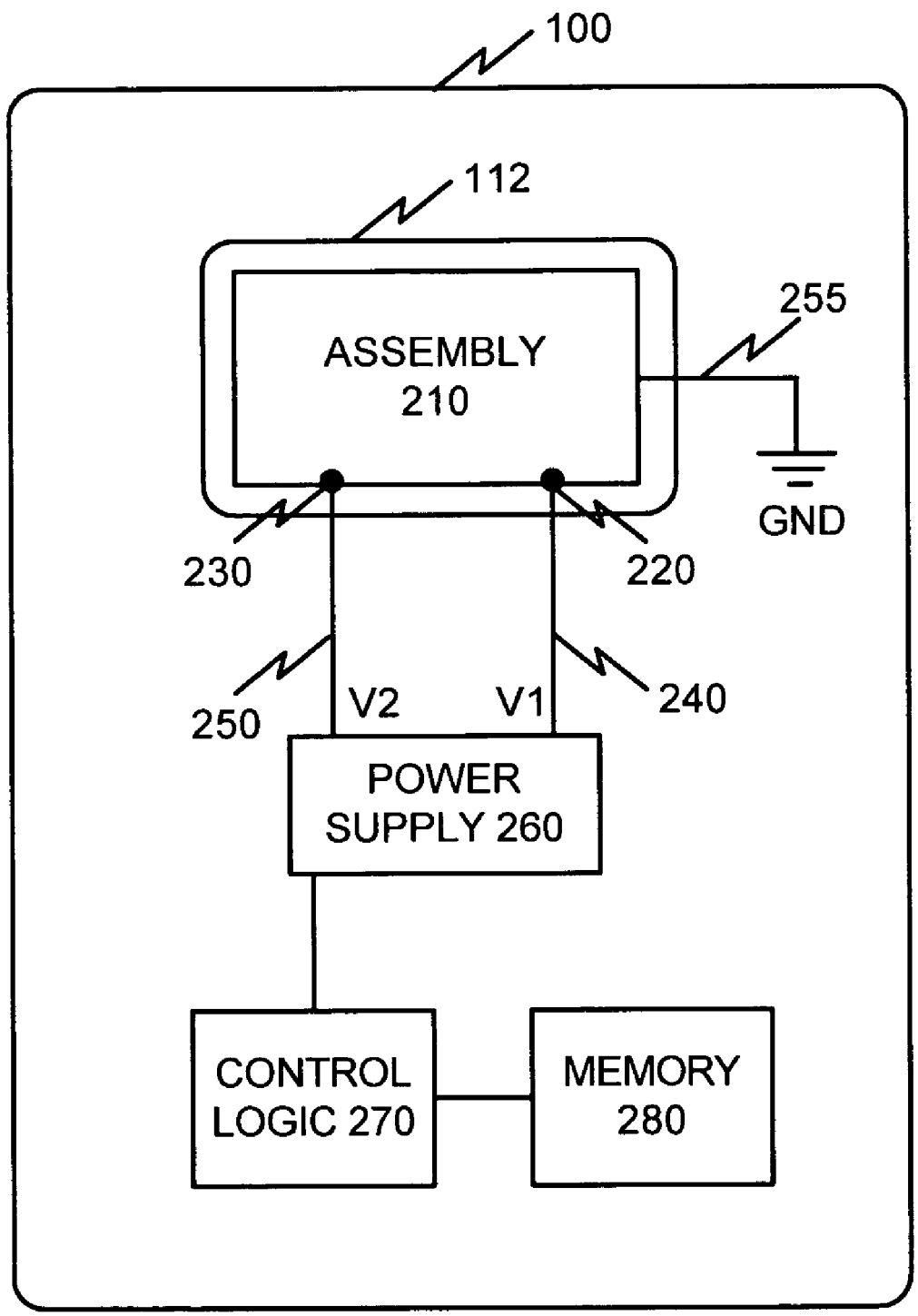
FIG. 2 illustrates an exemplary functional diagram of a portion of a terminal that can employ multi-faced keys consistent with the principles of the invention.

FIG. 2 illustrates an exemplary functional diagram of a portion of terminal 100 that can employ multi-faced keys consistent with the principles of the invention. Terminal 100 may include key 112, assembly 210, first terminal 220, second terminal 230, first supply lead 240, second supply lead 250, ground lead 255, power supply 260, control logic 270 and memory 280.

Assembly 210 may include devices or components configured to display first key information or second key information to a user. For example, assembly 210 may provide first key information to a user when components of assembly 210 are in a first position with respect to each other or with respect to a housing of key 112 (e.g., key housing 113) and may provide second key information to a user when components of assembly 210 are in a second position with respect to each other or with respect to key housing 113. Implementations of assembly 210 may operate with a single key, such as key 112A, or may be operate with a number of keys, such as keys in group 160 (e.g., keys 112A-C). Ground lead 255 may include a device or structure, such as a wire, that couples a portion of assembly 210 to ground.

Power supply 260 may include a device configured to provide a determined current to assembly 210 via first supply lead 240 or second supply lead 250. Power supply 260 may be implemented as an analog or digital supply and may operate via alternating current (AC), such as via a wall outlet, or direct current (DC), such as via a battery. Power supply 260 may be configured to provide one or more output voltages/currents, such as via dual voltage/current supplies. Power supply 260 may include supply logic that can be used to control duty cycles and to generate waveforms to energize components of assembly 210. In one implementation, first supply lead 240 may provide a first current waveform to assembly 210 via a first terminal 220 and second supply lead 230 may provide a second current waveform to assembly 210 via second terminal 230. First terminal 220 and second terminal 230 may include lugs, soldered connections, crimped connections, etc., consistent with the principles of the invention.

Control logic 270 may include any type of processing logic that may interpret and execute instructions. Control logic 270 may be implemented in a standalone or distributed configuration. Implementations of control logic 270 may be hardwired logic, such as application specific integrated circuits (ASICs), field programmable gate arrays (FPGAs), etc., based on desired configurations of devices implementing aspects of the invention.

Memory 280 may include a random access memory (RAM), read only memory (ROM), or another type of storage device that may store information and instructions for execution by control logic 270. Memory 280 may also be used to store temporary variables or other intermediate information during execution of instructions by control logic 270. Memory 280 may also include removable media, such as a magnetic disk and/or optical disk and its corresponding drive for storing information and/or instructions.

Exemplary Assembly

Figure 3A:
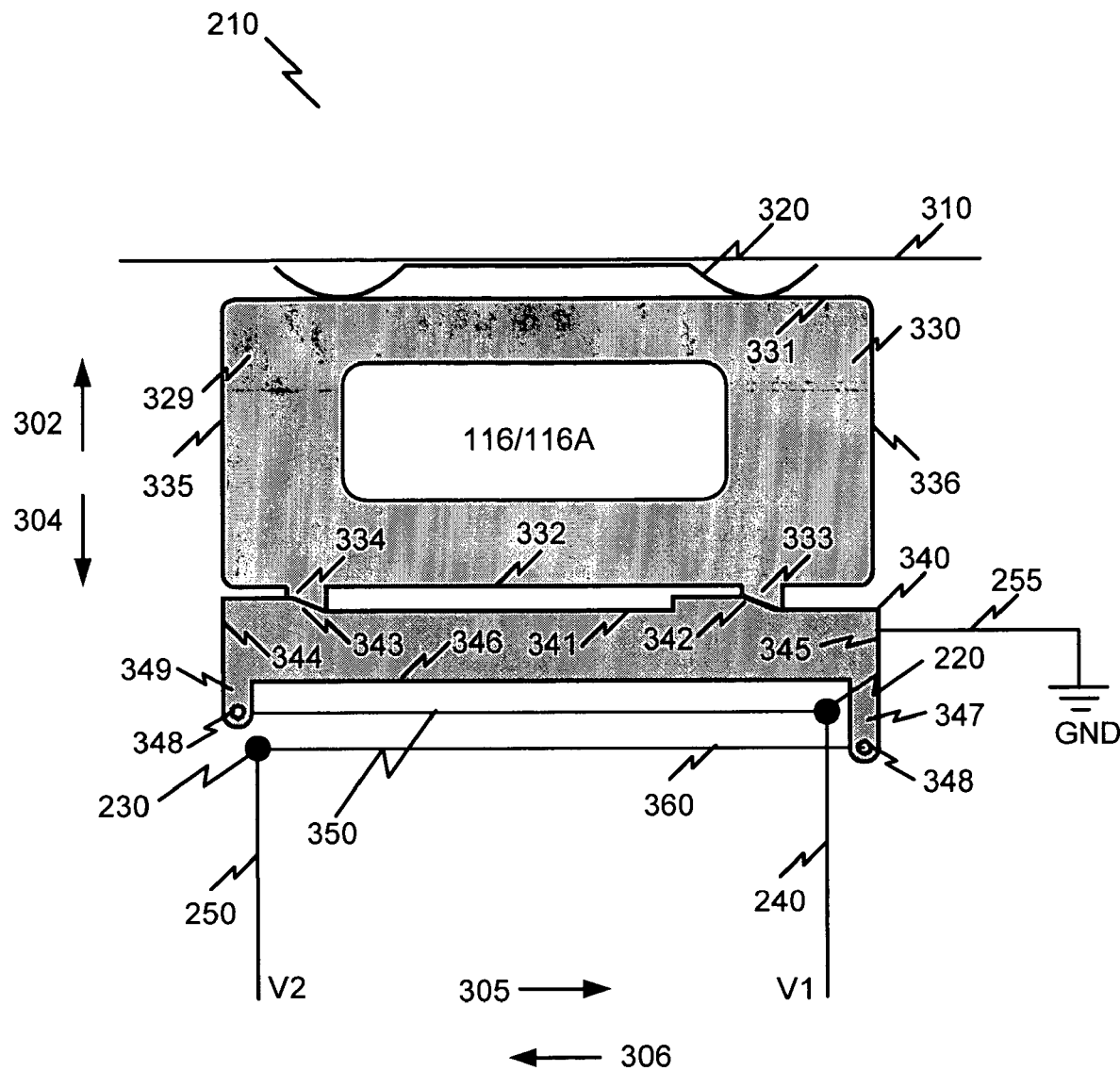
FIGS. 3A-3C illustrate exemplary implementations of an assembly that can be used to displace an icon sheet with respect to a lens consistent with the principles of the invention.
Figure 3B:
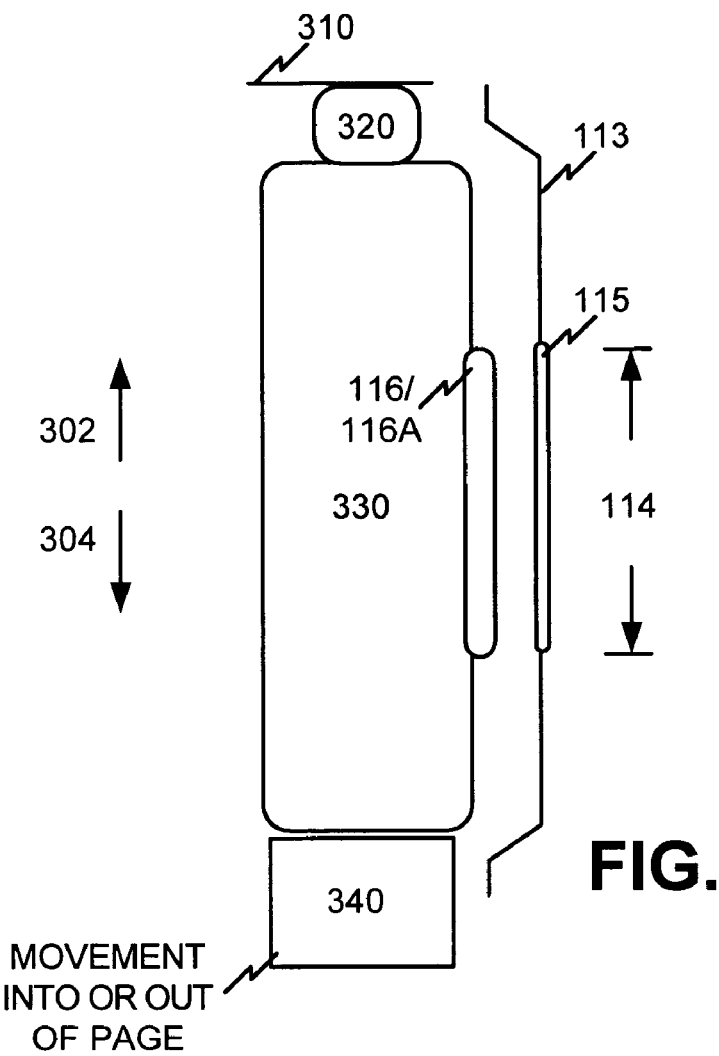
Figure 3C:
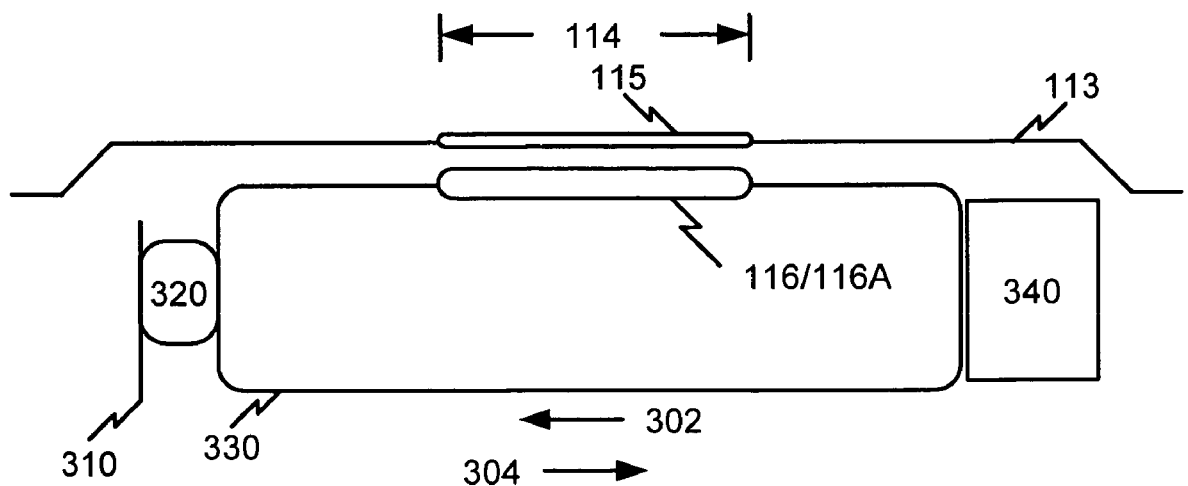

FIGS. 3A-3C illustrate exemplary implementations of an assembly that can be used to displace an icon sheet with respect to a lens consistent with the principles of the invention. Assembly 210, as shown in FIG. 3A, may include key icons 116/116A, first terminal 220, second terminal 230, first supply lead 240, second supply lead 250, structure 310, spring 320, icon sheet 330, actuator 340, first wire 350, and second wire 360.

Structure 310 may include a surface that contacts a surface of spring 320. For example, structure 310 may include an inner surface of housing 101, such as an inner surface of sides 102-105, that contacts an upper surface of spring 320. Spring 320 may include a device configured to exert a force between a first surface and a second surface and may be manufactured from metal, plastic, rubber, etc. In one implementation, spring 320 may be adapted to exert a force on structure 310 and icon sheet 330 sufficient to maintain a relationship between structure 310, icon sheet 330 and/or actuator 340. For example, spring 320 may cause friction between surfaces of structure 310, icon sheet 330 and actuator 340 to help maintain relationships therebetween. In one implementation, spring 320 may be configured to exert sufficient pressure on icon sheet 330 and actuator 340 so as to prevent movement therebetween unless first wire 350 or second wire 360 is contracting.

Icon sheet 330 may include a structure or device that can include one or more implementations of key icons 116/116A (e.g., "1" and "a"). Implementations of icon sheet 330 may be fabricated from plastic, ceramic, rubber, metal, etc. Icon sheet 330 may include an icon surface 329 to support one or more key icons, such as key icons 116/116A. In one implementation, icon surface 329 may be a surface on a side of icon sheet 230. Key icons 116/116A may be positioned on icon surface 329 so as to be visible to a user when icon sheet 330 is in a determined position with respect to window 114 and/or lens 115.

Icon sheet 330 may have an upper surface 331 that may contact a surface of spring 320, such as a lower surface of spring 320. Icon sheet 330 may have a lower surface 332 that may include a first leg 333 and a second leg 334 that are adapted to interact with portions of an upper surface 341 of actuator 340. First leg 333 and second leg 334 may operate to displace icon sheet 330 a determined distance. For example, in one implementation, first leg 333 and second leg 334 may displace icon sheet 330 in direction 302 that may be substantially parallel with respect to key housing 113 and/or lens 115 (e.g., when icon sheet 230 is displaced in direction 302 or 304). In a second implementation, first leg 333 and second leg 334 may be configured to displace icon sheet 330 in direction 305 or 306. For example, actuator 340 may move in direction 305 and icon sheet 330 may move in direction 305. In a third implementation, first leg 333 and second leg 334 may be configured to displace icon sheet 330 in directions 302 or 304 and 305 or 306.

Icon sheet 330 may include a first side 336 and an opposing second side 335. First side 336 and second side 335 may operate with guides (not shown) to prevent icon sheet 330 from exceeding a displacement limit.

Actuator 340 may include a device or structure that can be displaced a determined amount using one or more displacement devices or structures, such as first wire 350 and second wire 360. Actuator 340 may be solid or made of layers, such as a laminated stack, and may be made of conductive material, such as metal and/or ceramic, and/or may be made of non-conductive material, such as plastic and/or dielectric material. Actuator 340 may have an upper surface 341 that includes a first contour 342 and a second contour 343. In one implementation, first contour 342 and second contour 343 may be sloped surfaces adapted to operate with first leg 333 and second leg 334, respectively. Actuator 340 may include a lower surface 346 that may form a first actuator leg 347 with first actuator side 345 and second actuator leg 349 with second actuator side 344.

First actuator leg 347 and second actuator leg 349 may include an opening 348 that is adapted to receive an end of first wire 350 or second wire 360. An end, such as a proximal end, of first wire 350 or second wire 360 may be attached to first leg 347 and/or second leg 349 so as to form a connection that allows actuator 340 to be displaced by determined amounts, such as a determined number of millimeters (mm).

First wire 350 and second wire 360 may include a device or structure that is electrically conductive. In one implementation, first wire 350 and second wire 360 may be fabricated from material that changes shape when a voltage and/or current is applied thereto. For example, first wire 350 and second wire 360 may be fabricated from memory shape alloys that change shape and/or other properties as a function of one or more parameters, such as temperature. In one implementation, first wire 350 or second wire 360 may be configured to contract (i.e., a fixed length becomes shorter) when wire 350/360 is heated beyond a threshold. Implementations of first wire 350 and second wire 360 may be implemented using alloys that have poor conductivity (e.g., alloys that have resistive characteristics) to precipitate heating of first wire 350 and/or second wire 360 to obtain desired characteristics, such as a change in length, when a current is applied to wire 350/360.

Table 1 illustrates exemplary characteristics of wires that can be used in implementations of first wire 350 or second wire 360 consistent with the principles of the invention.

TABLE 1

Exemplary Wire Properties

| | | |
|---|---|---|
| Wire Diameter (millimeters) | 0.05 | 0.125 |
| Resistance (ohms/meter) | 510 | 70 |
| Typical Power (watts/meter) | 1.28 | 4.4 |
| Contraction speed at typical power (seconds) | 1 | 1 |
| Maximum Recovery Force (grams) | 117 | 736 |
| Deformation Force (grams) | 8 | 43 |
| Heat Capacity (Joules/g) | 0.32 | 0.32 |

Implementations of wires suitable for use as first wire 350 or second wire 360 may include memory shape alloys made from nickel and titanium that may be known as muscle wire to those skilled in the relevant arts (e.g., trade names of Nitinol and Flexinol). Implementations that use muscle wire may contract on the order of 3% to 5% when heated beyond a threshold temperature. For example, an implementation, such as the implementation of FIG. 3A, may use muscle wire for first wire 350 and second wire 360 that contracts at temperatures on the order of 88 to 98 degrees centigrade and that relaxes (i.e., returns to the pre-heated state) at temperatures on the order of 62 to 72 degrees centigrade.

In one implementation, first wire 350 and second wire 360 may be configured to exert sufficient force when contracting to overcome friction between mating surfaces of spring 320, icon sheet 330 and actuator 340. For example, spring 320, icon sheet 330 and actuator 340 may maintain a relationship due to friction caused by spring 320 unless first wire 350 or second wire 360 is contracting in response to an applied current. First wire 350 and second wire 360 can be used in lengths that provide determined amounts of actuator displacement. For example, first wire 350 can be cut to a size that displaces actuator 340 from a first position with first wire 350 in a relaxed state to a second position with first wire 350 in a contracted state. An amount of electrical power required to cause a desired actuator displacement can be determined based on a desired degree of heating of first wire 350 or second wire 360, the heat capacity of wire 350/360, and the resistance of wire 350/360.

Implementations of first wire 350 and second wire 360 can be driven with steady state currents or variable currents. For example, in one implementation, first wire 350 or second wire 360 may be driven with a waveform, such as a pulse width modulated (PWM) waveform. Waveforms, such as PWM, can be selected to provide desired amounts of heating to first wire 350 or second wire 360, to allow determined amounts of cooling of wires 350/360, to provide power control for causing rapid movement of actuator 340, and to control current flow through wires 350/360.

FIG. 3B illustrates assembly 210 in an exemplary relationship with key housing 113 and lens 115. In the arrangement of FIG. 3B, key icons 116/116A may be placed on icon surface 329 and lens 115 may be supported by key housing 113 on upper surface 106 (FIG. 1A). Key icons 116/116A may be arranged so that key icon 116 is visible to a user via window 114 when icon sheet 330 is in a first position and so that key icon 116A is visible to the user when icon sheet 330 is in a second position. Actuator 340 may be displaced in a direction that is into the page of FIG. 3B or a direction that is out of the page of FIG. 3B via first wire 350 or second wire 360. Icon sheet 330 may be displaced in direction 302 or 304 in response to displacement of actuator 340. Key icons 116/116A may be displaced substantially parallel to lens 115 via displacement of icon sheet 330. In alternative arrangements of assembly 210, not shown in FIG. 3B, implementations of icon sheet 330 may be configured to move toward or away from window 114, or both substantially parallel to window 114 and toward/away from window 114 when icon sheet 330 moves from a first position to a second position.

FIG. 3C illustrates the components of FIG. 3B arranged with lens 115 in a position that may be representative of an arrangement of components as they would be seen by a user of terminal 100. For example, lens 115 and key housing 113 may face a user of terminal 100 as the user interacts with keys 112 based on information included in key icons 116/116A.

Exemplary Icon Sheet Displacement Technique

Figure 4A:
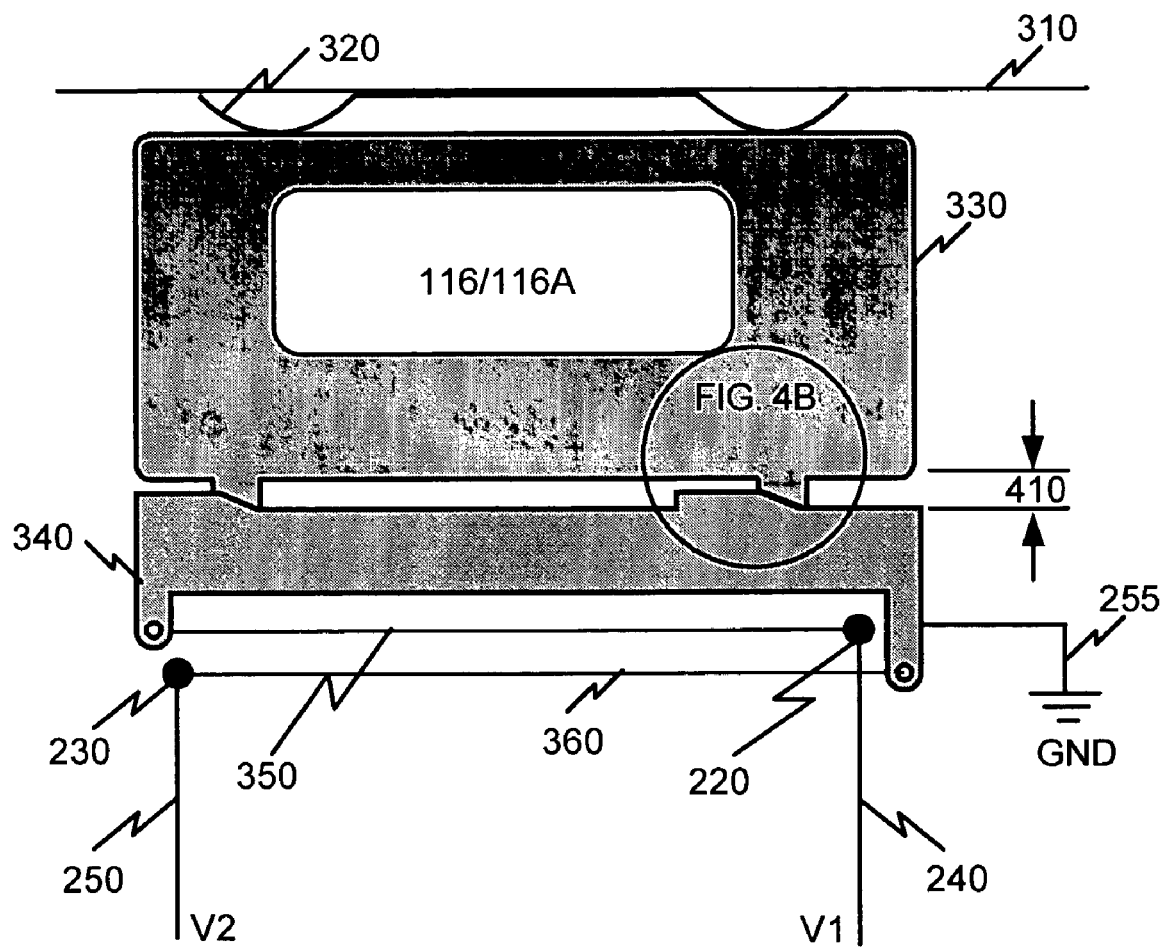
FIGS. 4A-4D are diagrams illustrating a technique for displacing an icon sheet that includes key icons consistent with the principles of the invention.

FIGS. 4A-4D are diagrams illustrating a technique for displacing an icon sheet that includes key icons consistent with the principles of the invention. FIG. 4A illustrates icon sheet 330 and actuator 340 in a first relationship. The first relationship may occur when first wire 250 is in a relaxed state and may provide a first distance 410 between lower surface 432 and upper surface 441. The first relationship of FIG. 4A may include key icons 116/116A in a first position with respect to lens 115 and window 114.

Figure 4B:
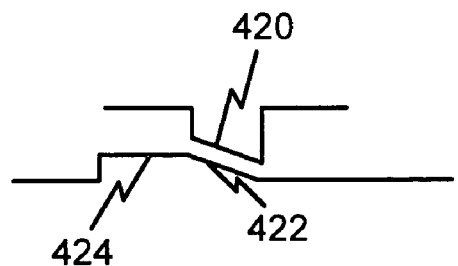

FIG. 4B illustrates the first relationship of FIG. 4A in greater detail. In FIG. 4B, the relationship between mating surface 420, of icon sheet 330, and first mating surface 422, of actuator 340, is visible. In FIG. 4B, surface 420 may be supported by surface 422. The relationship between icon sheet 330 and actuator 340 illustrated in FIGS. 4A and 4B may display key icon 116 to a user through window 114.

Figure 4C:
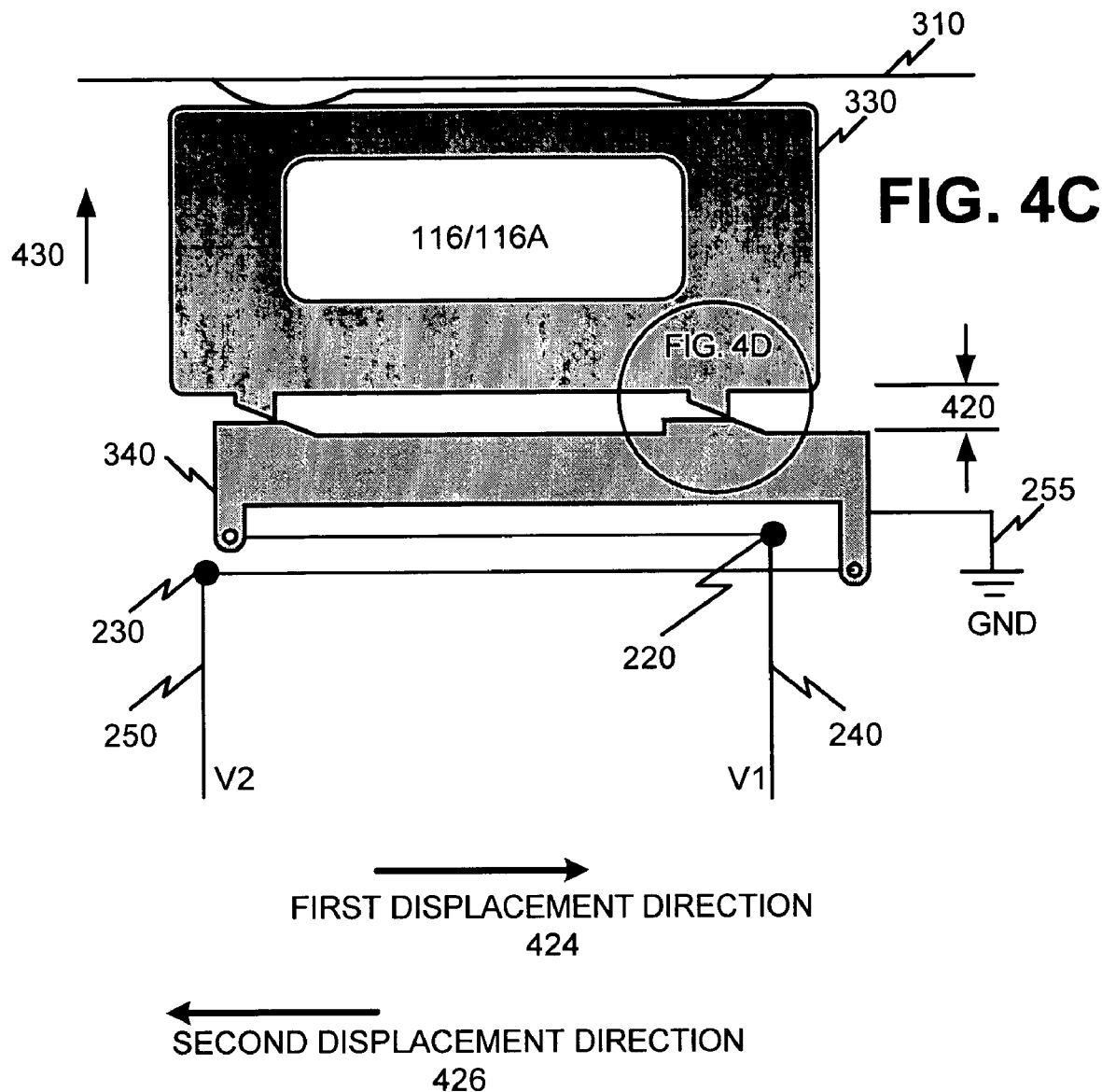
Figure 4D:
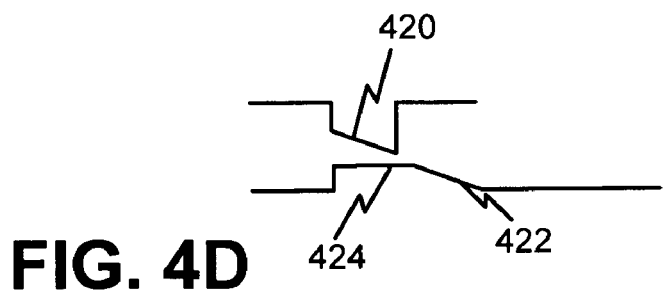

FIG. 4C illustrates a second relationship for icon sheet 330 and actuator 340. The second relationship may be present when actuator 340 has been displaced in first displacement direction 424. Displacing actuator 340 in direction 424 may cause a portion of first leg 233 to contact second mating surface 424 of actuator 340, as shown in FIG. 4D. Returning to FIG. 4C, icon sheet 330 may move in direction 424, in direction 430, or in directions 424 and 430 when actuator 340 is displaced in direction 424. For example, icon sheet 330 may experience some displacement in direction 424 prior to moving along slope 422 and being displaced in direction 430 when actuator 340 is displaced in direction 424. Lower surface 332 of icon sheet 330 may be displaced a second distance 420 from upper surface 341 when icon sheet 330 moves in direction 430. In one implementation, second distance 420 may be greater than first distance 410 (FIG. 4A). The difference between first distance 410 and second distance 420 may be determined by the height of a slope associated with surface 422 (FIG. 4D). Actuator 340 may be displaced in second displacement direction 426 by contracting second wire 360. Actuator 340 and icon sheet 330 may be moved into the relationship of FIG. 4A when actuator 340 is displaced in direction 426 using second wire 360.

Surface 424 (FIG. 4D) may be configured to allow for over travel of actuator 340. For example, surface 424 may be configured so as to maintain distance 420 over a range of lateral actuator displacements.

Exemplary Interlaced Icon Implementation

Figure 5A:
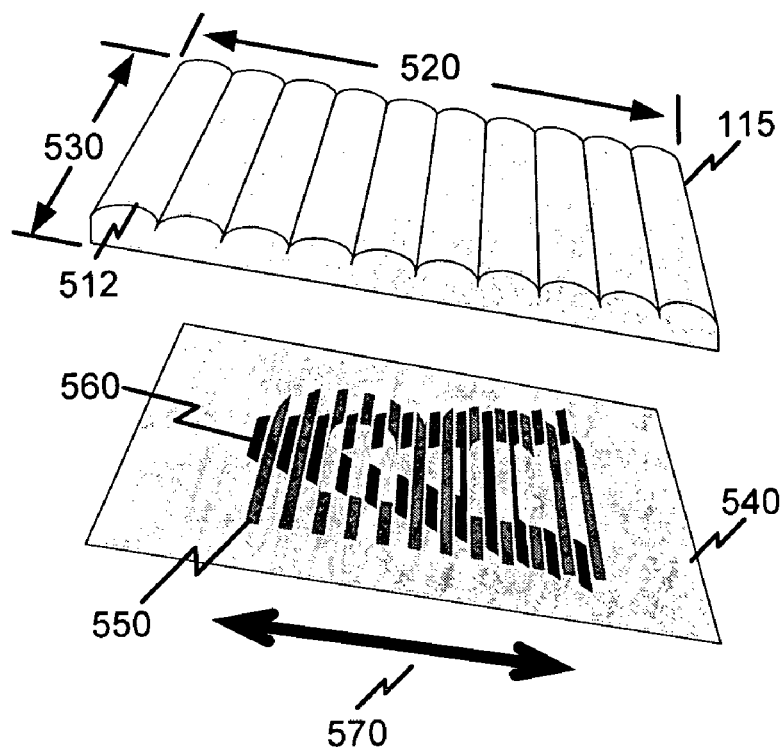
FIG. 5A illustrates an exemplary implementation of a lenticular lens that can be used in an implementation consistent with the principles of the invention.

FIG. 5A illustrates an exemplary implementation of a lenticular lens that can be used in an implementation consistent with the principles of the invention. The implementation of FIG. 5A is representative of a multi-faced key that can be configured to operate with lens 115. Other implementations (not illustrated in FIGS. 5A and 5B) may be configured to work with lenses that are not lenticular lenses. For example, an implementation may operate with a lens that is non-magnifying and/or that does not redirect or refocus a user's line of sight onto a key icon (e.g., a transparent sheet or film having a uniform cross-section). Still other implementations (not illustrated in FIGS. 5A and 5B) may be configured to work without lenses. For example, an implementation may be configured without a lens covering an upper surface of window 114.

Lens 115 may include a group of lenticules 512 arranged to redirect and/or refocus a user's line of sight onto one of two or more image portions, such as stripes 550 (e.g., key icon 116) or stripes 560 (e.g., key icon 116A). In one implementation, lens 115 may be configured as a plano-convex lens that is made of transparent or semi-transparent material and can be fabricated from glass, plastic, acrylic, composites, etc., consistent with the principles of the invention. Lens 115 may have a length 520 and width 530 that are configured to provide a user with one or more key icons as a function of the relationship of lens 115 to stripes 550/560. Implementations of lens 115 may be arranged to operate with displacements of stripes 550/560 substantially parallel to window 114 or lens 115 and/or to operate with displacements of stripes 550/560 toward or away from window 114 or lens 115.

Length 520 and width 530 may be selected based on a size of key housing 113, window 114, key icons 116/116A, terminal 100, etc. For example, length 520 may be selected to accommodate a certain number of lenticules 512 per unit length (e.g., inch or millimeter), an be referred to as pitch.

Stripes 550/560 may be disposed onto printed surface 540. Printed surface 540 may be affixed to a surface of icon sheet 330, such as icon surface 329, via adhesive or other attachment mechanisms. Stripes 550/560 may be generated and interlaced using computer applications and may be black and white or color. Implementations of lens 115 used with stripes 550/560 may include opaque portions on a lower surface of lens 115 to facilitate showing key icon 116 to a user when stripes 550 are in focus via lens 115 and key icon 116A to the user when stripes 560 are in focus via lens 115.

Printed surface 540 may include a first icon (e.g., key icon 116) that may include a first group of stripes (e.g., stripes 550) and a second icon (e.g., key icon 116A) that may include a second group of stripes (e.g., stripes 560). A user may see the first icon when lens 115 is in a first relationship with respect to printed surface 540, and the user may see the second icon when lens 115 is in a second relationship with respect to printed surface 540.

A first implementation may be configured to change a relationship between stripes 550/560 and window 114/lens 115 by moving stripes 550/560 substantially parallel to lens 115. For example, icon sheet 330 may move laterally with respect to lens 115 (as shown in FIG. 5A) to cause key icon 116 or key icon 116A to be visible to a user via stripes 550 or stripes 560, respectively. In this arrangement, printed surface 540 may move along direction 570 on the order of 0.05 to 0.1 millimeters while lens 115 remains stationary.

A second implementation may be configured to change a relationship between stripes 550/560 and window 114 by moving lens 115 and stripes 550/560 (key icons 116/116A) vertically with respect to key housing 113 and window 114. For example, lens 115 and key icons 116/116A may move toward or away from a key housing 113. A user may see key icon 116 when key icons 116/116A and lens 115 are a first distance from window 114 and the user may see key icon 116A when key icons 116/116A and lens 115 are a second distance from window 114.

A third implementation may be configured to have lens 115 move while printed surface 540 remains stationary. For example, stripes 550/560 may remain stationary while lens 115 moves substantially parallel to stripes 550/560. Moving lens 115 with respect to stripes 550/560 may change the relationship between lens 115 and stripes 550/560 so as to display key icon 116 or key icon 116A to a user of terminal 100.

Implementations that move key icons 116/116A relative to lens 115, that move both lens 115 and key icons 116/116A, and that move lens 115 relative to key icons 116/116A can be used with interlaced icons. For example, first stripes 550 and second stripes 560 may be interlaced to provide a user with key icon 116 from a first viewing angle (e.g., when stripes 550/560 have a first relationship with respect to lens 115) and key icon 116A from a second viewing angle (e.g., when stripes 550/560 have a second relationship with respect to lens 115). Lens 115 may be oriented in a variety of ways so as to accommodate lateral, vertical, or combined lateral and vertical displacements of key icons 116/116A consistent with the principles of the invention.

Figure 5B:
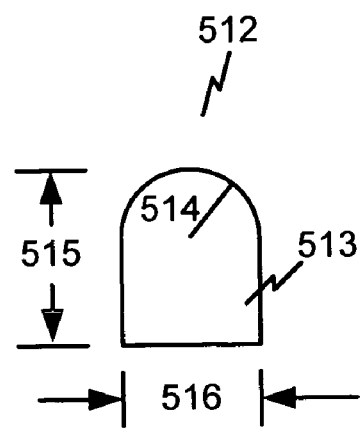
FIG. 5B illustrates an exemplary lenticule that can be used in the lenticular lens of FIG. 5A consistent with the principles of the invention.

FIG. 5B illustrates an exemplary lenticule that can be used in a lenticular lens consistent with the principles of the invention. Lenticule 512 may include a volume 513, radius 514, a height 515, and width 516. Volume 513 may include material from which lenticule 512 is fabricated. Radius 514 may operate with height 515 and width 516 (also referred to a period 516) to provide a desired key icon 116/116A to a user as a function of viewing angle and/or displacement of icon sheet 330 with respect to lenticule 512. The dimensions and relationship of radius 514, height 515 and period 516 can be varied based on design parameters and/or applications in which lenticule 512 is used. For example, in one implementation, icon sheet 330 may be displaced a distance on the order of radius 514 with respect to lenticule 512. Displacing icon sheet 330 a distance on the order of radius 514 may cause a first icon (e.g., 1) to change to a second icon (e.g., a).

Implementations of lenticule 512 and lens 115 may be adapted to provide the user with different viewing experiences, such as flip mode, morph mode, zoom mode, depth mode, and/or three dimensional (3D) mode. In flip mode, a user may see one image or another image depending on a viewing angle with respect to printed surface 540. In morph mode, a starting image may appear to transition, or morph, into an ending image. In zoom mode, an image may appear to move toward or away from a viewer as a function of viewing angle with respect to printed surface 540. Depth mode may cause an image to move with respect to a background. For example, an image may appear to float in front of lens 115 while the background appears to recede into printed surface 540. In 3D mode, an image may appear to have contours and mass.

Exemplary Non-Interlaced Icon Implementation

Figure 6:
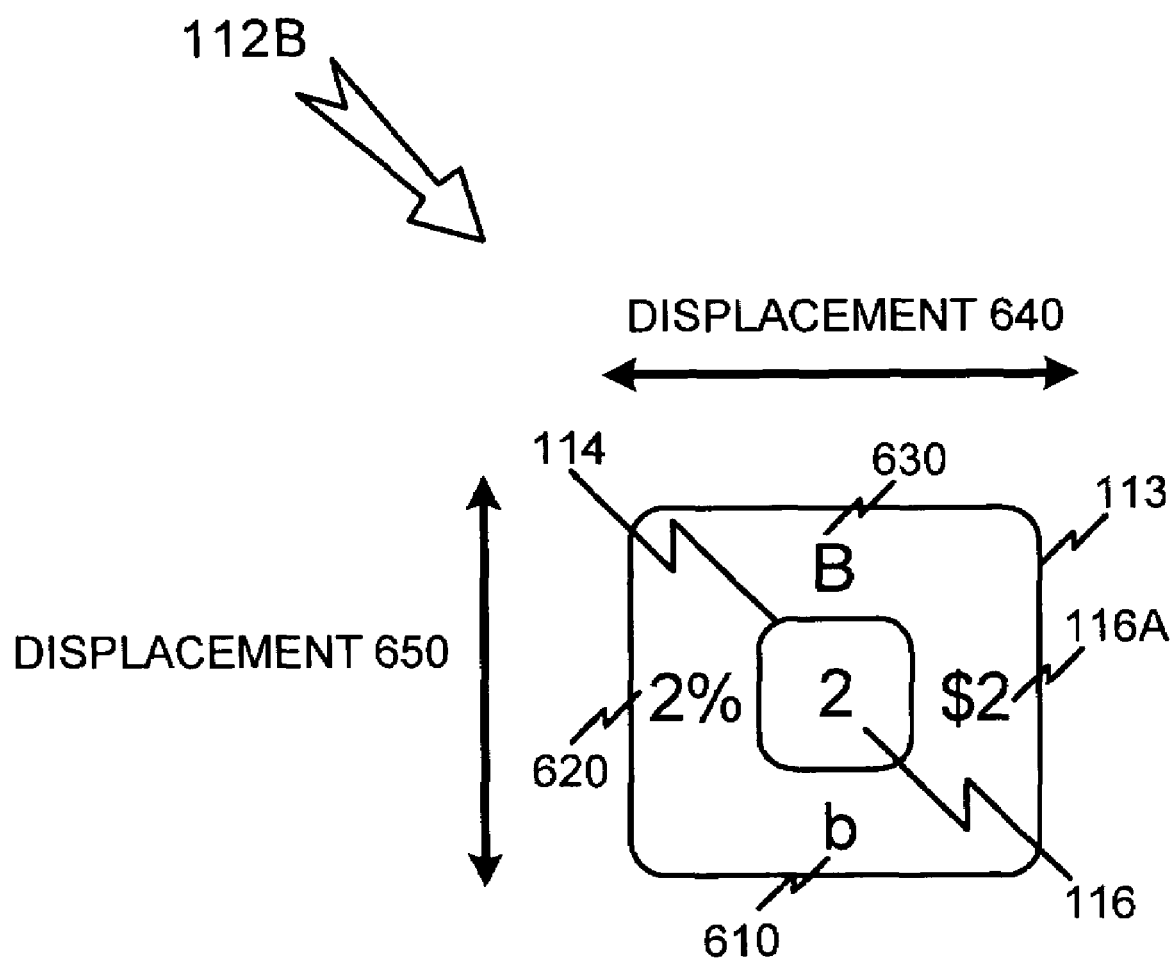
FIG. 6 illustrates an implementation of a multi-faced key that can be used to display a number of key icons consistent with the principles of the invention.

FIG. 6 illustrates an exemplary implementation of a multi-faced key that can be used to display a number of key icons consistent with the principles of the invention. The implementation of FIG. 6 is one example of a multi-faced key that can be configured to work with implementations of lens 115 that are not lenticular lenses and that do not magnify or change the appearance of an icon that is positioned relative to window 114. For example, lens 115 used in the implementation of FIG. 6 may include a transparent planar film that is configured to protect icons from dirt and moisture. The implementation of FIG. 6 may further be configured to work without a lens.

FIG. 6 illustrates an implementation of key 112B that is configured with five icons. In the exemplary implementation of FIG. 6, key 112B includes icon 116 (2), icon 116A ($2), icon 610 (b), icon 620 (2%), and icon 630 (B). Key 112B can be displaced in direction 640 to display icon 116, 116A or 620 to a user of terminal 100. Key 112B can be displaced in direction 650 to display icon 116, 610 or 630 to a user of terminal 100. While the implementation of FIG. 6 has been illustrated and described with five icons, the implementation of FIG. 6 can include more than five icons or less than five icons consistent with the principles of the invention.

Exemplary Method

Figure 7:
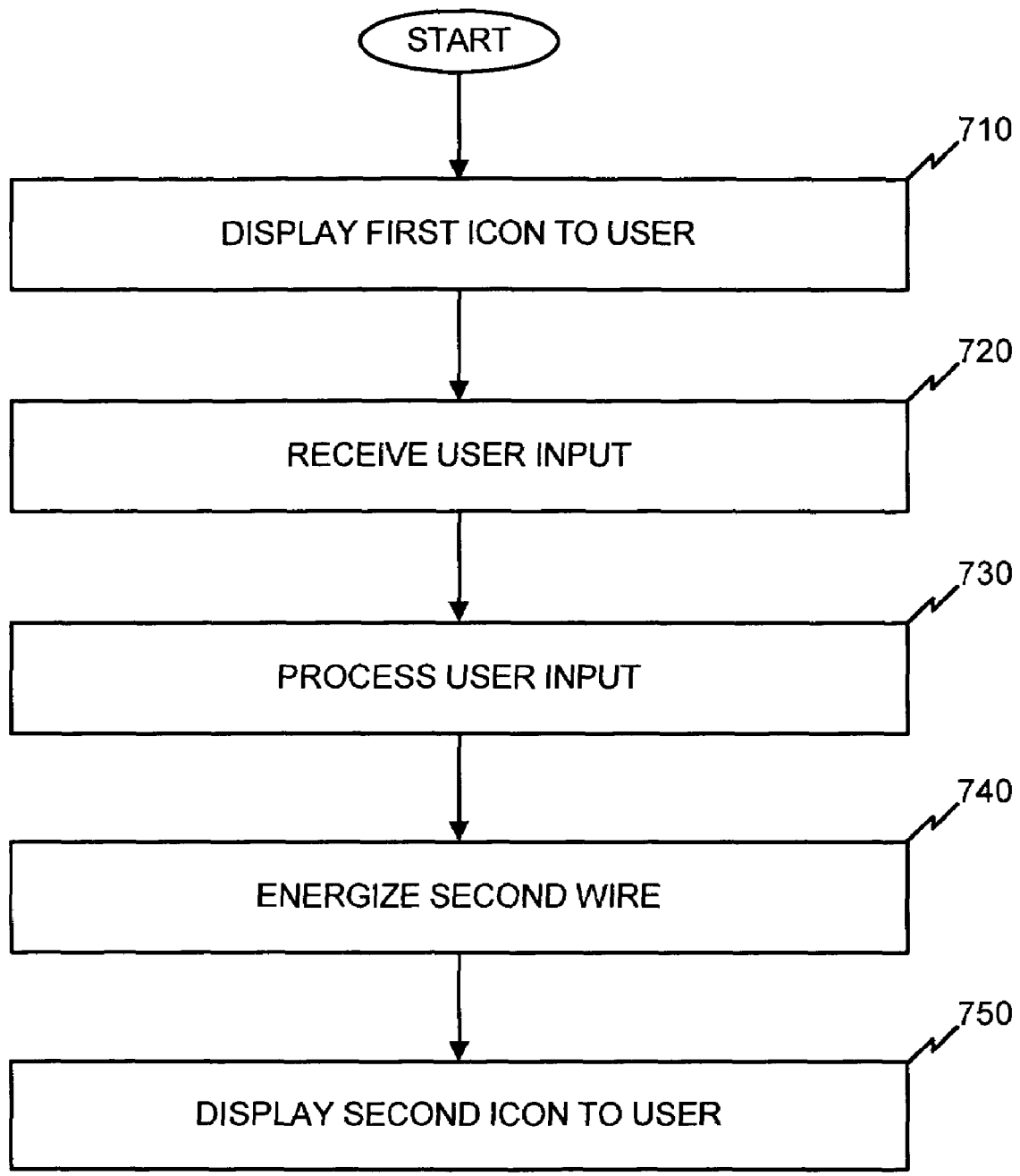
FIG. 7 is a flowchart of an exemplary method consistent with the principles of the invention.

FIG. 7 is a flowchart of an exemplary method consistent with the principles of the invention. The method of FIG. 7 may include user interactions with terminal 100 via keypad 110 consistent with the principles of the invention. A key icon, such as key icon 116, may be displayed to a user (act 710). For example, first wire 350 may be energized via power supply 260 to cause icon sheet 330 to be displaced into a first position that causes key icon 116 to be visible to a user via window 114. In response to first wire 350 being energized, icon sheet 330 may move substantially parallel to key housing 113 or window 114 (i.e., may move laterally with respect to a portion of key housing 113 or window 114). Alternatively, icon sheet 330 may be displaced toward or away from key housing 113 when first wire 350 is energized via power supply 260. Key icon 116 may display information to a user via an image, number, letter, or symbol consistent with the principles of the invention.

Terminal 100 may receive a user input (act 720). For example, a user may depress control key 120 to request that different information is displayed via keys 112A-L. The user request may be that a first group of icons, such as key icons 116, be replaced with second group of icons, such as key icons 116A. Alternatively, the user may speak a command, such as "switch keys." Speech processing logic may convert the spoken command into a digital signal that can be processed by control logic 270. Implementations may also cause key icons 116 to be replaced with key icons 116A automatically, such as when a signal is received via terminal 100 and/or an event occurs, such as receipt of a message at terminal 100.

Terminal 100 may process the user input (act 730). In one implementation, terminal 100 may process the user request via control logic 270. Control logic 270 may determine that a first group of key icons, such as key icons 116, should be replaced with second group of key icons, such as key icons 116A. Control logic 270 may retrieve information from memory 280 and may send the retrieved information to power supply 260. Retrieved information may include instructions that identify an amount of current to apply to first wire 350 or second wire 360 and a time interval over which the current should be applied to cause a desired outcome, such as a displacement of actuator 340 from a first position to a second position. For example, control logic 270 may send an instruction to power supply 260 that identifies an amount of current that should be applied to second wire 360 to cause actuator 340 to be displaced from a first position to a second position (e.g., displaced from the position of FIG. 4A to the position of FIG. 4C). The displacement of actuator 340 from the first position to the second position may cause icon sheet 330 to be displaced from a first position to a second position.

Power supply 260 may energize second wire 360 to cause actuator 340 to move in a manner that causes icon sheet 330 to move from a first position to the second position with respect to window 114 (act 740). For example, power supply 260 may apply a waveform, such as a PWM waveform, to second wire 360. Energizing second wire 360 via PWM waveforms may cause second wire 360 to contract at a rate which is faster than if a steady state current was applied to second wire 360. A temperature of second wire 360 may increase due to heating caused by the applied current in the PWM waveform and second wire 360 may contract when its temperature exceeds a threshold. An amount of contraction (shrinkage) for second wire 260 may be determined based on characteristics thereof.

Displacing actuator 340 from the first position to the second position may displace icon sheet 330 on the order of one half of a pitch, e.g., approximately 0.1 mm to 0.2 mm, substantially parallel to window 114 lens 115. In another implementation, icon sheet 330 may be displaced on the order of one half of a pitch toward or away from window 114. In still another implementation, icon sheet 330 may be displaced both substantially parallel and toward/away from window 114 in response to displacement of actuator 340 by the contraction of second wire 260.

A second icon, such as key icon 116A, may be displayed to a user when second wire 360 has contracted a determined amount (act 750). The user may interact with one or more keys 112 based on information displayed via key icon 116A.

When the user desires to interact with terminal 100 based on information associated with a first icon, such as key icon 116, the user may request that one or more keys display key icon 116. The user may interact with terminal 100 to cause power supply 260 to energize first wire 350. Energizing first wire 350, such as by applying a current thereto, may cause contraction of first wire 350. Contraction of first wire 350 may cause icon sheet 330 to be displaced with respect to window 114. Displacement of icon sheet 330 in response to contraction of first wire 350 may cause the first group of icons that include key icon 116 to be displayed to the user. Power supply 260 may be configured to allow cooling intervals between energizing cycles for first wire 350 and second wire 360 so as to achieve a desired actuator response. For example, power supply 260 may allow second wire 360 to reach a temperature that is within a range of temperatures that cause second wire 360 to be in a relaxed state before energizing first wire 350.

Implementations consistent with the principles of the invention may be configured to energize first wire 350 and second wire 360 at the same time. For example, first wire 350 may be energized to display a first image to a user, second wire 360 may be energized to display a second image to a user, and first wire 350 and second wire 360 may be energized at substantially the same time to display a third image to a user.

CONCLUSION

Implementations consistent with the principles of the invention may facilitate changing information associated with a key. Changing information associated with a key may allow devices, such as terminal 100, to remain compact while providing users with an interface that allows users to input multiple types of information without having to memorize the selection of shift keys, special function keys and/or keypad overlays. Multi-faced keys may be used to present information to users in a way that does not require that the user remember unique key sequences in order to access more than one type of information associated with a key.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

While a series of acts has been described with regard to FIG. 7, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. In a substantially planar keypad including multi-faced keys, a method for providing key information to a user, the method comprising:

providing first key information to a user when an actuator is in a first position;
receiving a request for second key information;
applying a current to a first wire connected to the actuator in response to the request for second key information;
displacing the actuator linearly, in a first direction parallel to the plane of the keypad, to a second position as a result of the applied current; and
providing the second key information to the user when the actuator is in the second position.

2. The method of claim 1, where the applying further comprises:
applying the current for a determined time that is based on a composition of the wire.

3. The method of claim 1, where the applying further comprises:
applying the current via a waveform.

4. The method of claim 1, where the displacing further comprises:
displacing an icon sheet in a direction substantially parallel or substantially perpendicular to a direction of displacement of the actuator.

5. The method of claim 4, where the displacing further comprises:
displacing the icon sheet with respect to a lenticular lens.

6. The method of claim 1, where the displacing further comprises:
displacing an icon sheet from a first position with respect to the actuator to a second position with respect to the actuator, where the displacing the icon sheet to the second position with respect to the actuator causes the second key information to be provided to the user.

7. The method of claim 6, where the displacing the icon sheet causes the icon sheet to be displaced a determined distance away from the actuator when the icon sheet is in the second position.

8. The method of claim 1, further comprising:
applying a current to contract a second wire; and
displacing the actuator linearly, parallel to the first direction from the second position to the first position in response to contracting the second wire, where the first position provides the first key information to the user.

9. A keypad assembly, comprising:
a substantially planar icon sheet, comprising:
a first image associated with first key information, and
a second image associated with second key information;
an actuator to:
support a proximal end of a first wire having a first length, the first wire to:
displace the actuator linearly, in a first direction parallel to the plane of the icon sheet, to a first position when the first length chan as a result of a current applied to a distal end of the first wire, and
support a proximal end of a second wire having a second length, the second wire to:
displace the actuator linearly, parallel to the first direction, to a
second position when the second length changes; and
a lens to:
provide the first image to a user when the actuator is in the first position, and
provide the second image to the user when the actuator is in the second position.

10. The assembly of claim 9, comprising:
a supply to provide a current to a distal end of the second wire to cause the second length to change.

11. The assembly of claim 9, where the actuator is further to:
displace the icon sheet a first distance with respect to a portion of the lens when the actuator is in the first position,
displace the icon sheet a second distance with respect to the portion of the lens when the actuator is in the second position, and
maintain the second distance over a range of actuator displacements.

12. The assembly of claim 11, where the first image has a first relationship with respect to the lens when the first distance is present and a second relationship with respect to the lens when the second distance is present.

13. The assembly of claim 9, where the actuator is coupled to ground.

14. The assembly of claim 9, where the first image or the second image is back lit.

15. The assembly of claim 9, where the first wire or the second wire comprises a memory shape alloy.

16. The assembly of claim 15, where the memory shape alloy comprises nickel or titanium.

17. The assembly of claim 9, where a pulse width modulated (PWM) waveform causes a change in the first length or the second length.

18. The assembly of claim 9, where the lens is a lenticular lens.

19. The assembly of claim 9, where the lens is in a first relationship with respect to the first image when the actuator is in the first position and in a second relationship with respect to the first image when the actuator is in the second position.

20. The assembly of claim 9, where the icon sheet is coupled to the actuator.

21. A keypad assembly, comprising:
a surface, comprising:
a first plurality of stripes making up a first icon associated with first key information, and
a second plurality of stripes making up a second icon associated with second key information;
an actuator to:
displace the surface linearly, in a first direction to a first position in response to a change in length of a first wire as a result of a current applied to the first wire, and
displace the surface linearly, parallel to the first direction to a second position in response to a change in length of a second wire as a result of a current applied to the second wire; and
a lenticular lens to:
display the first icon to a user when the actuator is in the first position, and
display the second icon to the user when the actuator is in the second position.

22. A substantially planar keypad assembly, comprising:
a window, parallel to the plane of the keypad, to:
display key information to a user when the key information is in the window;
a surface, comprising:
first key information,
second key information, and
third key information; and
an actuator, connected to a wire, to:
move linearly, as a result of a current applied to the wire, in a first direction substantially parallel to the window to place the first key information into the window, move in a second direction substantially opposite to the first direction to place the second key information into the window, and move in a third direction substantially parallel to the window and substantially perpendicular to the first and second directions to place the third key information into the window.

23. A device, comprising:

means to render a first image associated with first key information of a substantially planar keypad or a second image associated with second key information of the substantially planar keypad to a user when an actuator is in a first position;

means to apply a current to a wire to cause the wire to change length;

means to displace the actuator linearly, parallel to the plane of the keypad as a result of the changed wire length; and means to change a relationship between the first image or the second image and the rendering means in response to displacing the actuator linearly, parallel to the plane of the keypad where the changed relationship causes the first image or the second image to be rendered to the user via the rendering means.

* * * * *